Apr. 17, 1923.
D. J. G. MILLER ET AL
1,452,088
GRINDING OR CRUSHING MACHINE
Filed June 20, 1922
5 Sheets-Sheet 4
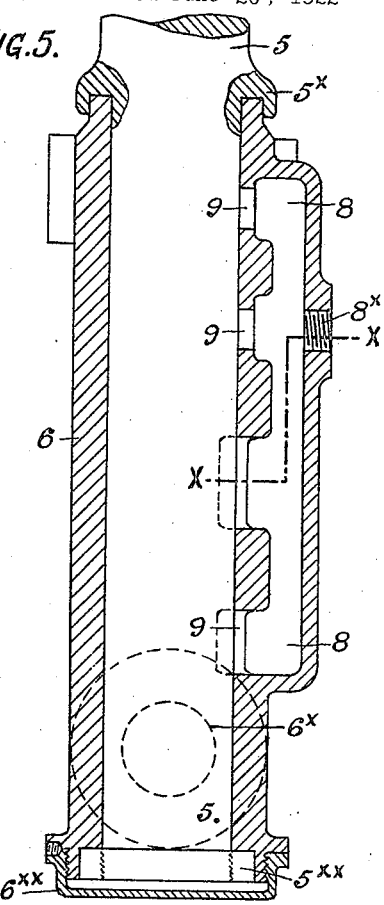
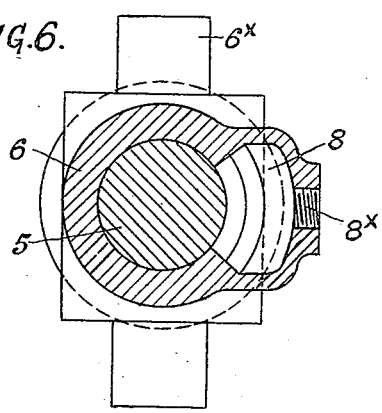
Inventors
D. J. G. Miller
R. H. Lloyd
by
Atty Patented Apr. 17, 1923.

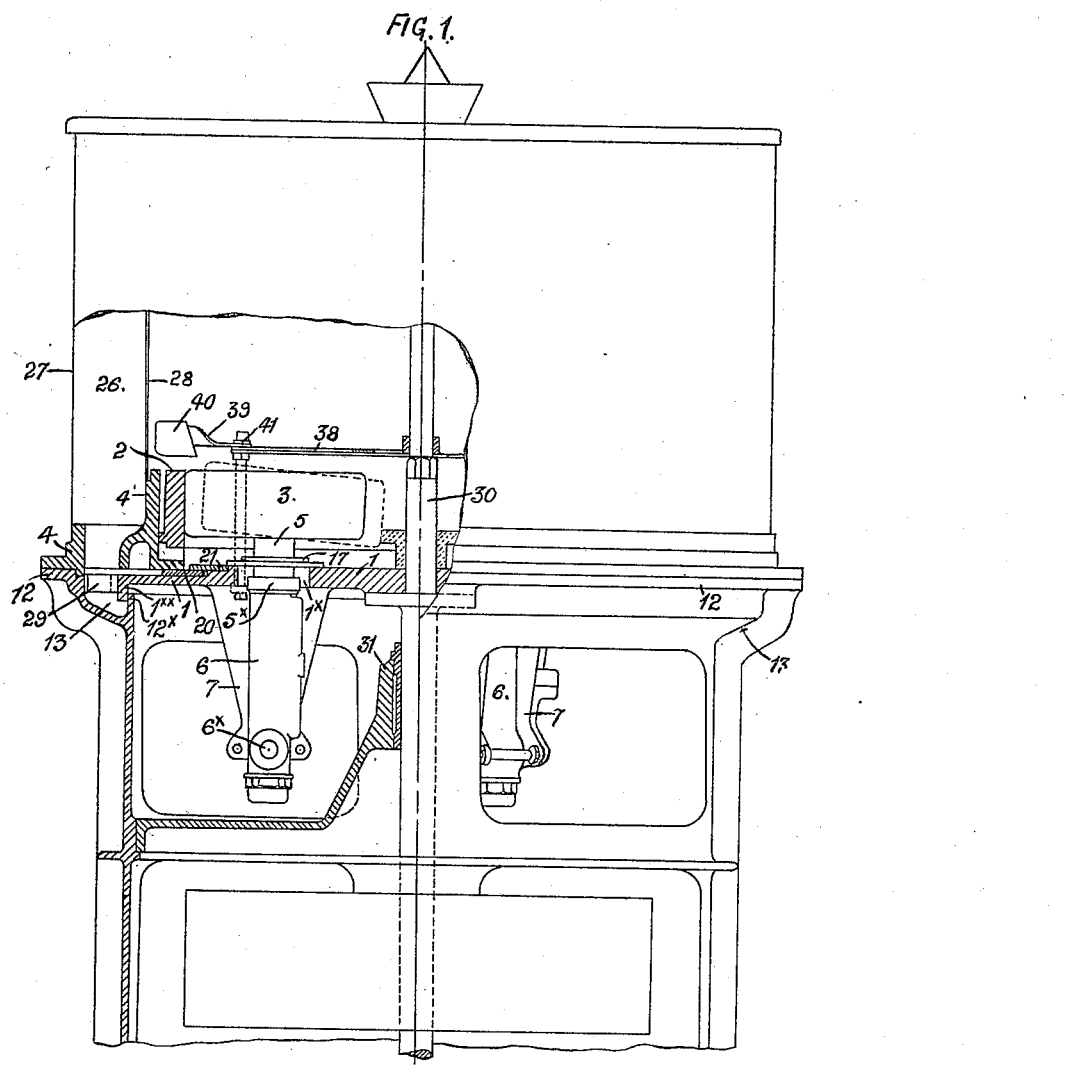

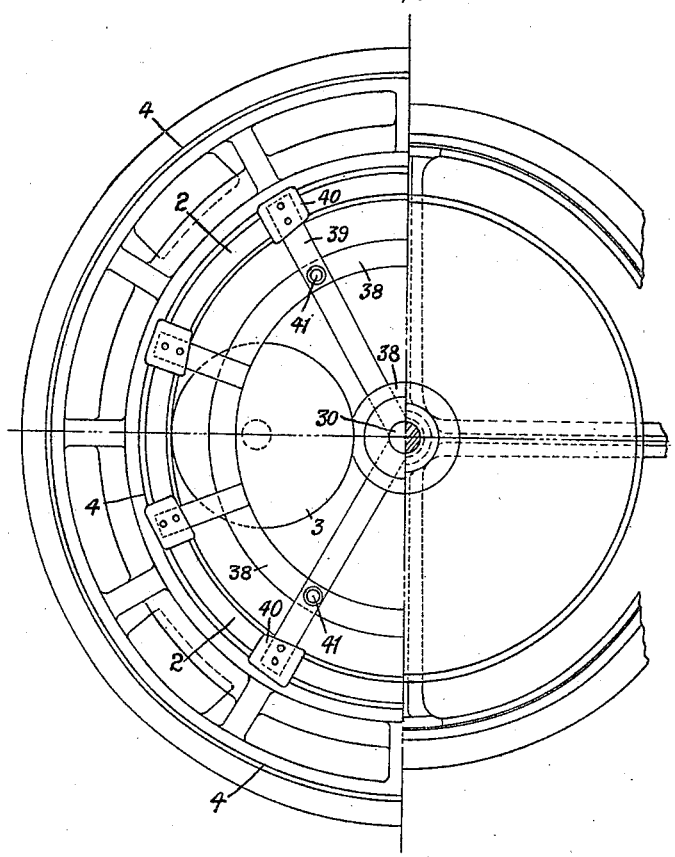

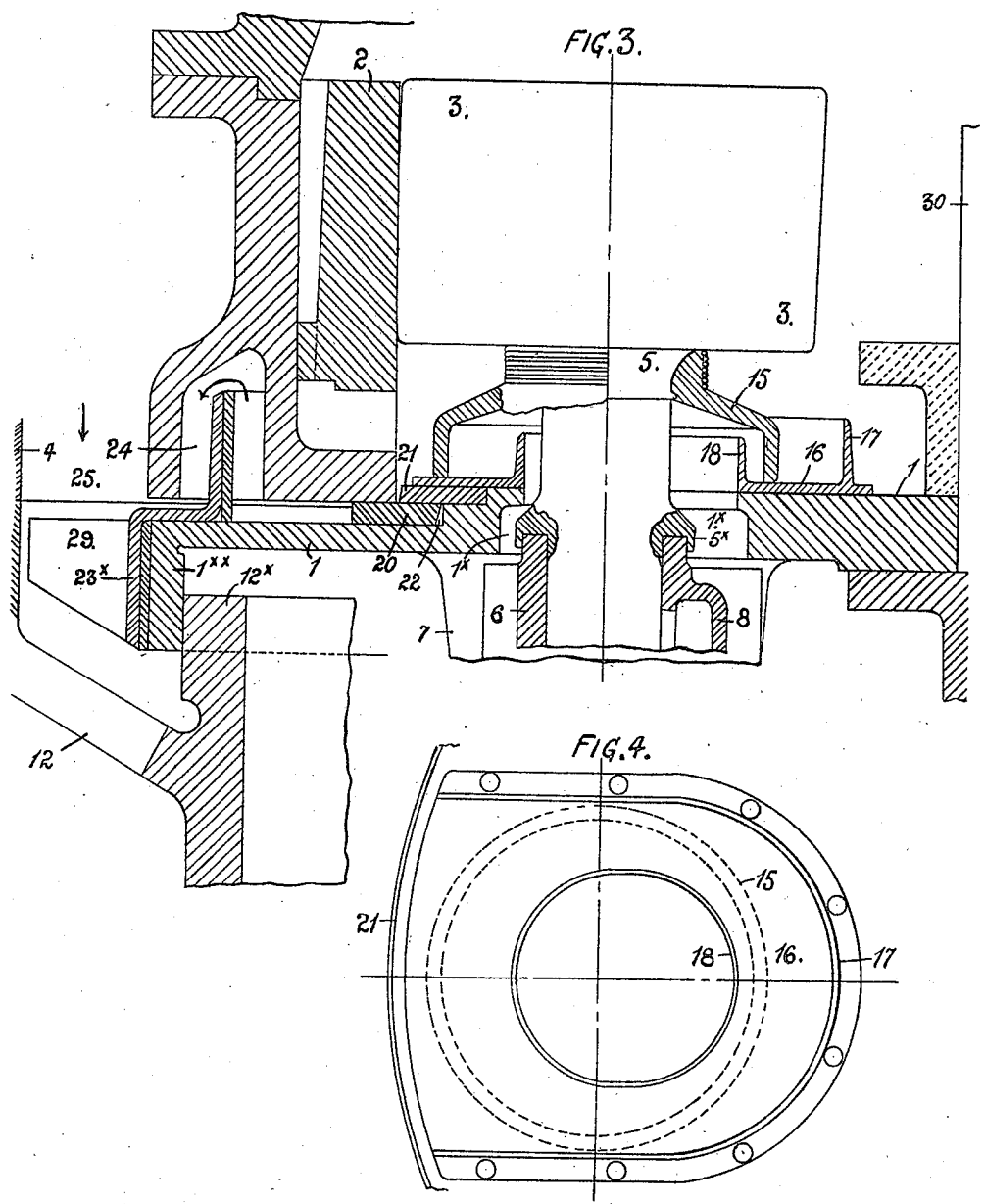

1,452,088

UNITED STATES PATENT OFFICE.

DONALD JOHN GUNN MILLER, OF BOOTLE, AND RICHARD ASSHETON LLOYD, OF LIVERPOOL, ENGLAND.

GRINDING OR CRUSHING MACHINE.

Application filed June 20, 1922. Serial No. 569,733.

*To all whom it may concern:*

Be it known that we, DONALD JOHN GUNN MILLER and RICHARD ASSHETON LLOYD, subjects of the King of England, and residing at Bootle, in the county of Lancaster, England, and Liverpool, in the county of Lancaster, England, respectively, have invented Improvements in Grinding or Crushing Machines, of which the following is a specification.

This invention has reference to mills for pulverizing slag, cement, rock, ore, minerals, grain, and other substances.

In the grinding or crushing machine of the kind hereinafter described, the improvements under this invention are comprised.

In the grinding or crushing machine according to this invention, the rollers have fixed spindles carried in bearings capable of moving radially in relation to the axis of the machine, and carried by and revolving with the revolving pan bottom, and the bearings are provided with lubricating chambers, so adapted that the lubricant is forced by centrifugal action on to the spindle. The roller spindles pass through holes in the pan bottom, and a flexible collar extends between the pan bottom round the said holes and the rollers or their spindles, and so adapted to make a closure between the interior of the pan, and its exterior.

The revolving bottom of the pan has a ring on it overlying a stationary ring on the pan frame, so that the flow or escape of material between them is resisted by centrifugal force; and further, in the pan fan plates are provided which revolve with the pan bottom, and are disposed directly above the crushing surface of the crushing ring, whereby the material from the crushing ring is thrown upwards.

The invention, the nature of which is above described, is illustrated in the annexed drawings, in connection with which it will be further described.

In these drawings, Figure 1 is an elevation partly in section, and Figure 2 is a plan partly in section, showing the machine. Figure 3 is a section; and Figure 4 is a plan showing a part of same, illustrating part of the machine to a larger scale in detail.

Figure 5 is a vertical section and Figure 6 is a sectional plan at XX Figure 5, showing the manner of carrying the roller spindle, and lubricating same.

Figure 7:
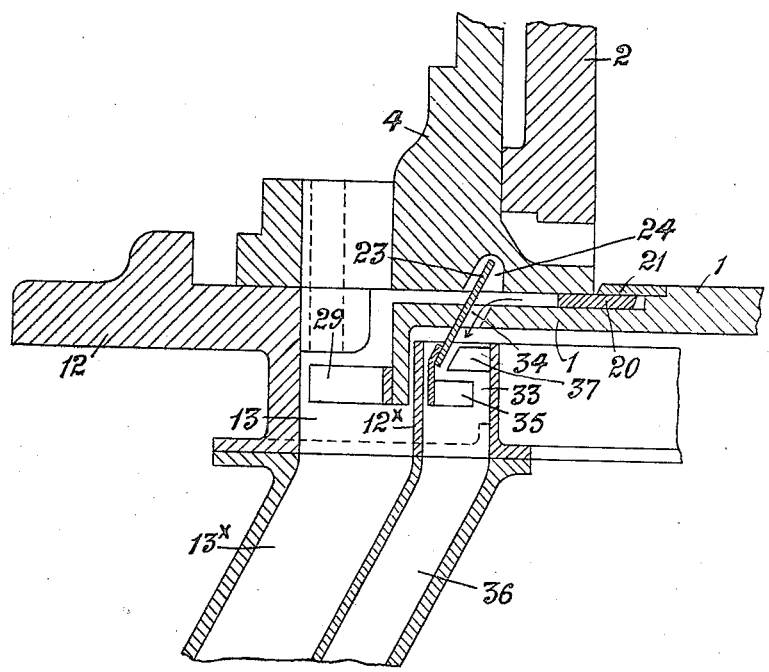
Figure 7 is a plan showing more particularly a manner of collecting and carrying off dust which escapes between the rotary pan bottom, and the stationary casing, beneath which it revolves.

Referring to the drawings, 1 designates generally the pan bottom, 2 is the crushing or grinding ring, 3 are the rollers which work and run on the inner surface of the ring 2; 4 is the main casing or ring frame of the machine in which the ring 2 is carried; 5 is the roller shaft; 6 is the bearing or sleeve in which the shaft 5 is carried and revolves, the shaft being fixed to the roller 3. 7 are brackets fitted or cast on the underside of the bottom 1, and supporting and carrying the bearings 6 by trunnion supports $6^x$.

12 is the base frame of the machine on which the ring frame 4 is carried, and to which it is fixed; and 13 is an annular channel in the base into which the powdered material falls.

The spindles 5 are fixed to the rollers 3, and revolve with same, and their bearings 6, as stated, are mounted by the trunnions $6^x$ in the brackets 7, fixed on the table 1.

The upper part of the shaft 5 has a ring $5^x$ upon it which lies over and outside the top of the bearing 6; and its lower end has a collar $5^{xx}$ which works on the bottom horizontal edge of the bearing 6; these parts being enclosed by a screw cap $6^{xx}$.

The oil reservoir 8 of the bearing 6 is placed on the inside of same in relation to the axis of the machine, and in the wall between the shaft 5 and the reservoir 8, are ports or openings 9, through which the lubricant has access to the shaft; and the centrifugal force of these revolving bearings and shaft throws the lubricant outwards on to the shaft by way of these apertures, so that the shaft is subject to a forced lubricating action.

The lubricant chamber 8 is supplied with lubricant through the aperture $8^x$.

Not only will the lubricant tend to pass horizontally from the chamber 8, but through the centrifugal action it will rise up in the box 8, and so always be supplied through the various apertures in the bearing to the shaft 5.

Dust is prevented from entering the bearing 6 by the overlapping ring $5^x$ at the upper part.

The shafts 5 pass through the openings $1^x$ in the table 1, and a joint is made between these openings and the interior of the pan by means of an india-rubber or like collar 15, the lower edge of which works on a plate 16 fixed on the table 1, and having inner and outer baffle rings or collars 17, 18; and as the spindle 5 and roller 3 move radially and swing about the trunnions $6^x$, the collar 15 moves over the surface of the plate 16, making with it a sealed joint or closure between the interior of the pan and its exterior.

The ring or collar 17 prevents material getting into the space within it, and also therefore, prevents through the centrifugal force the dust being forced under the lip of the collar 17; whilst if any dust escapes past it, it is prevented from falling into the hole $1^x$ by the collar 18, and is caused by the centrifugal force to pass round this collar 18 to the portion of the lip of the collar 17 nearest the wall of the ring frame 4, and the centrifugal force at this end point tends to force any dust or like matters under the lip again back into the pan chamber, which is rendered possible by the inner portion of the collar 17 being discontinued at this outer part. Thus the holes in the rotary pan bottom, through which the shafts 5 pass, are sealed ones.

The rubber or like flexible collar can be bound on the shaft 5 in any suitable way.

With regard to the means for preventing fine crushed material from escaping between the stationary ring frame 4, and the bottom of the pan, joint rings 20 and 21 are provided on the bottom of the ring frame 4, and in a recess in the top of the rotary pan bottom 1, respectively, the rotating ring 21 overlying the stationary ring 20, as shown. Thus the revolving material on the pan bottom 1, owing to its centrifugal force, does not tend to force itself through the joint between the upper ring 21, and the ring 20, this force tending rather to press away material that may be between the two rings 20 and 21 outwards, into the pan; but should any small quantity of dust be moved by mechanical action through this ring joint, it would pass into the space 22, and then between the ring 20 and pan bottom 1, into the space outside the crushing ring; and on the table 1 at this point there is provided an upwardly projecting ring 23, which works in an annular channel 24 in the ring 4, so that these parts act as a baffle, tending to prevent the flow of air and dust, and the creation of a vacuum or pull on the joint between the rings 20 and 21. Outside the inner and outer portions of the ring 4, is the passage 25, through which the discharge of the crushed material from the annular space 26 between the outer wall 27 and the perforated screen 28 passes; and in the channel 13, fan blades 29, fixed on the ring $23^x$— which is an extension of the ring 23—work, and carry the ground material round to the discharge spout $13^x$—see Figure 7—by which the material is carried off.

In the case shown in Figures 3 and 4, the rotary pan bottom 1 is provided with a depending annular flange $1^{xx}$ which works in contact with the outer surface of the upper edge of the ring $12^x$ of the frame 12, so as to make a closure at this point.

The table 1 is carried on a shaft 30, which is supported and revolved in an upper bearing 31 in the frame of the machine, and another bearing below, in the ordinary way.

In the modification shown in Figure 7, the ring 23 on the table 1 extends below as well as above it, as shown, the upper part working in the annular channel 24, and the lower part extending into a channel 33 inside the wall $12^x$ of the channel 13, to which it is suitably connected; and the ring 23 in this case in inclined, as shown, so that any dust reaching it is pressed by centrifugal force into the angle of the ring with the table; and near this angle holes 34 are provided, through which the material can pass down through the table, and by the lower part of the ring 23 is conducted into the channel 33.

Vanes 35 are attached to the ring 23, similar to the vanes or blades 29, to carry the material down or round the channel 33 to the point of its delivery spout 36, where it is discharged; and above these vanes 35 are other vanes 37 fixed on the inner wall of the channel 33, and so inclined that they tend to prevent or keep down any dust that rises above the vanes 35. These vanes say may be placed from one to two or three feet apart, or at other suitable distance according to the size of the machine.

A fan or fans may be fitted on the underside of the table 1 adjacent to the inner wall of the channel 33, with its blades so inclined, that they force air towards this channel between the bottom of the pan bottom and the top of the inner wall of the channel, so keeping back any escape of dust.

As regards this manner of preventing the escape of dust, this can also be applied to the revolving roller spindle.

Figure 8:
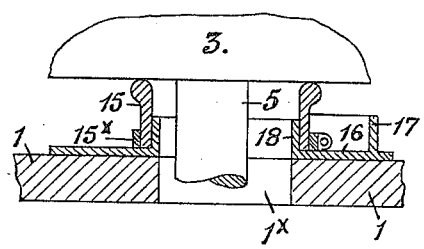
Figure 8 is a detail view showing a modification hereafter described.

In Figure 8 is shown a modified construction of means for preventing the escape of air and material from the interior of the pan. In this case, the rubber or like collar 15 is fastened by a clamp ring or like $15^x$, on to the ring 18 round the hole $1^x$, the upper edge of the rubber collar lying and working in contact with the under surface of the roller 3.

It will be noted that there will seldom be very much movement between this collar and the roller, but there will always be a certain amount of movement and rubbing action.

If desired, in some cases, the space 22 between the inner end of the ring 20, and the end of the recess in the bottom 1 in which this ring lies, may be wider than that shown, and in it small blades which act as fans may be used, which tend to force back any dust that may tend to pass between the rings 21 and 20 inwards, towards the centre of the machine.

Attached to and carried from the bottom of the pan by means of studs 41, are rings 38 and arms 39, on the ends of which vanes 40 are fixed, which are so inclined and disposed that they catch the crushed material rising from the surface of the grinding ring 2, which they are immediately above, and throw it upwards and distribute it over the interior surface of the screen 28.

The part of the arms which carry the blades 40 are pivoted on the studs 41, and can be adjusted singularly and fixed at any angle required; and if desired the blade and carrier arms may be loosely mounted on the studs 41, and normally pressed in one direction by a spring, so that if a blade should strike an obstruction that may get into the machine, it will give way to it, and after passing it, the spring will bring the blade back to the normal position, say up to a holding stop.

What is claimed is:—

1. A grinding or crushing machine, comprising a revolving pan, rollers, spindles for supporting the rollers, said spindles being carried in radially moving bearings revolving with the pan and passing through openings in the pan bottom, and a flexible collar extending about said openings and between the pan bottom and rollers, whereby to make a closure for said openings.

2. A grinding or crushing machine of the character referred to, including a revolving pan, a frame in which said pan is mounted, a ring on the revolving pan, a stationary ring on the frame underlying said ring on the pan, a space being provided between the stationary ring and the bottom of the pan to direct any material finding its way between the rings in a predetermined direction.

3. In a grinding or crushing machine, a stationary frame, a revolving pan therein, overlapping rings arranged on said frame and pan bottom respectively, and an upwardly projecting ring on the pan bottom adapted to seat in a recess in the wall of the pan, the relation of one of said overlapping rings to the bottom of the pan providing an escape for the material finding its way between said rings and directing said material through said escape toward said upwardly projecting ring.

4. A grinding or crushing machine, including a stationary frame formed with a channel, a pan revolving in said frame and having apertures in the bottom thereof, and a flange projecting into a recess in the stationary frame serving to provide an abutment for directing the material into said apertures.

5. A grinding or crushing machine, having a pan, means for rotating the pan roller spindles passing therethrough, rollers on said spindles, a plate arranged on the pan bottom about the spindle openings therein, said plate having spaced upstanding flanges, and a collar carried by the roller spindles and engaging the plate between the flanges.

6. A grinding or crushing machine, having a pan, means for rotating the pan roller spindles passing therethrough, rollers on said spindles, a plate arranged on the pan bottom about the spindle openings therein, said plate having spaced upstanding flanges, and a collar carried by the roller spindles and engaging the plate between the flanges, the outermost flange being interrupted to provide an escape for any material which may collect on the plate between the flanges.

In testimony whereof we have signed our names to this specification in the presence of two subscribing witnesses.

DONALD JOHN GUNN MILLER.
RICHARD ASSHETON LLOYD.

Witnesses:
F. DE SALES LYSAGHT,
BARBARA JAQUES.